(12) United States Patent
Robertson et al.

(10) Patent No.: US 6,708,829 B2
(45) Date of Patent: Mar. 23, 2004

(54) METHOD AND DEVICE FOR JOINING SCREENS

(75) Inventors: Graham Robertson, Edinburgh (GB); Caspar Hassall, Edinburgh (GB)

(73) Assignee: United Wire Limited, Edinburgh (GB)

( * ) Notice: Subject to any disclaimer, the term of this patent is extended or adjusted under 35 U.S.C. 154(b) by 0 days.

(21) Appl. No.: 10/191,360

(22) Filed: Jul. 8, 2002

(65) Prior Publication Data

US 2003/0042178 A1 Mar. 6, 2003

(30) Foreign Application Priority Data

Aug. 29, 2001 (GB) ............................................ 0120862

(51) Int. Cl.$^7$ ................................................ B07B 1/49
(52) U.S. Cl. ........................ 209/405; 209/408; 209/409; 209/411
(58) Field of Search ................................ 209/405, 408, 209/409, 411, 412

(56) References Cited

U.S. PATENT DOCUMENTS

| | | | | |
|---|---|---|---|---|
| 4,082,657 A | * | 4/1978 | Gage | 209/311 |
| 4,582,597 A | * | 4/1986 | Huber | 209/313 |
| 6,443,310 B1 | * | 9/2002 | Schulte et al. | 209/399 |

FOREIGN PATENT DOCUMENTS

| | | | | |
|---|---|---|---|---|
| GB | 2322590 A | * | 2/1998 | ............ B07B/1/46 |
| GB | 23225990 A | | 9/1998 | |

* cited by examiner

*Primary Examiner*—Donald P. Walsh
*Assistant Examiner*—Jonathan R Miller
(74) *Attorney, Agent, or Firm*—Barnes & Thornburg

(57) ABSTRACT

A screen is described wherein one end of the screen frame is provided with an upwardly open channel profile and the other end with a similar but downwardly open channel profile, such that the outboard edge of an upwardly open profile will fit within the channel of a downwardly open profile provided along the edge of an adjoining screen frame, to enable two such screens to be connected together and to enable linear movement in a direction generally perpendicular to the line of engagement and generally in the plane of at least one of the two screens, to be transmitted from one screen frame to the other. The engagement of one profile by another also serves to close the gap between the two screen frames and prevent at least particulate material from passing therebetween. Preferably the engagement prevents liquid from passing therebetween. The engagement may comprise a lost motion connection so as to permit one frame to be hingeable relative to the other about the connection, but still provides a reliable force-transmitting connection to enable a rear screen frame to be removed from the support structure simply by pulling out the front frame of the pair.

11 Claims, 3 Drawing Sheets

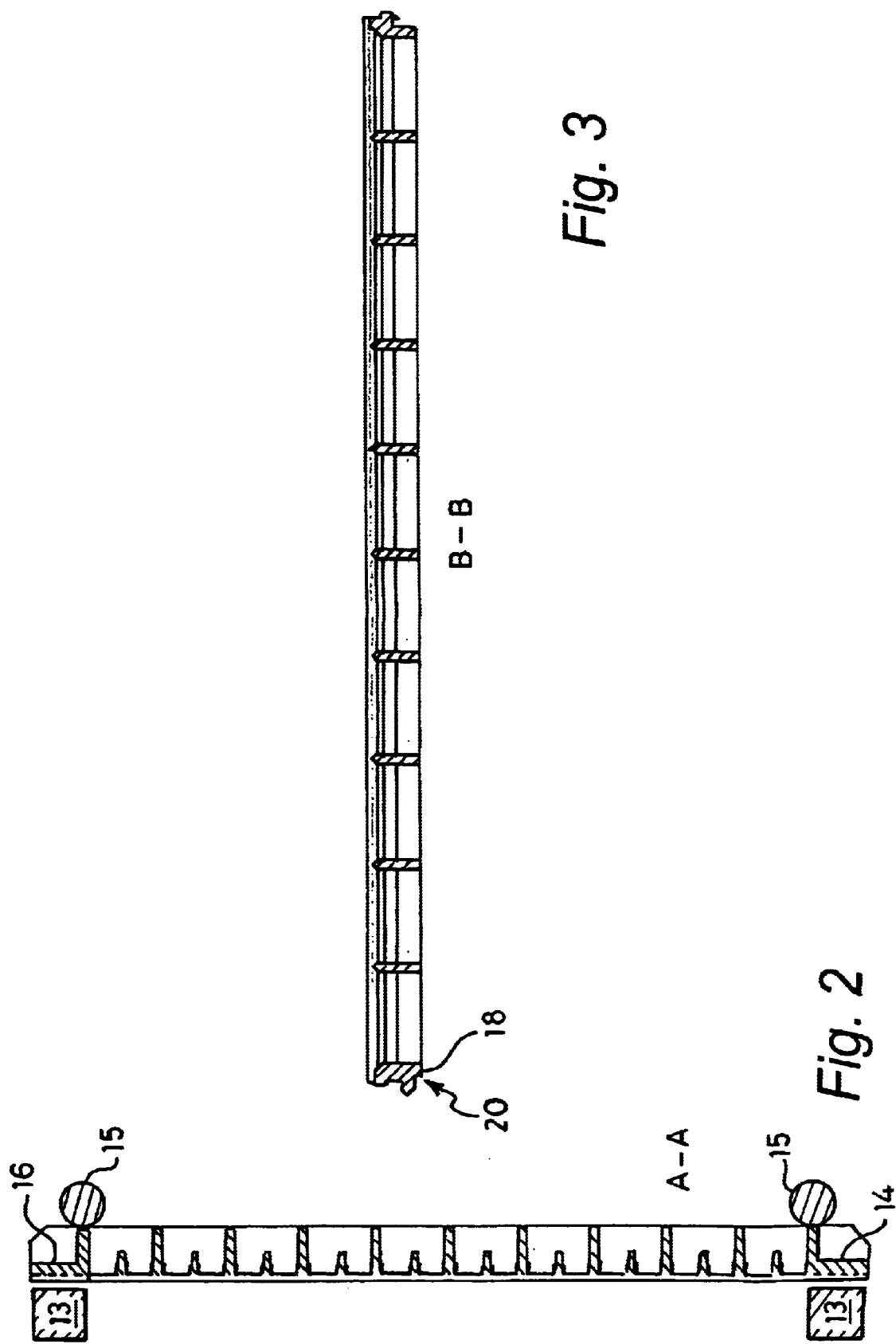

METHOD AND DEVICE FOR JOINING SCREENS

FIELD OF INVENTION

This invention concerns screens of the type disclosed in UK Patent Specification GB 2,322,590 and GB 2,292,533 and to a method and device for joining such screens end to end.

BACKGROUND

Screens of the type described such as shown in GB 2,322,590 and GB 2,292,533, have been provided with male and female edge formations at the ends of the screen frames, for the purpose of sealing the joint and to accommodate angular orientation of one screen relative to another when fitted within a shaker or sifting machine. However, none of the joints reliably connect one screen to the other to enable the two screens to be handled as one, when joined together and located in a frame support structure of such a machine.

It is an object of the present invention to provide for such a connection between the front edge of a rear screen and the rear edge of a front screen when mounted one behind the other in a shaker or sifting machine.

SUMMARY OF THE INVENTION

According to the present invention there is provided a screen of the type described wherein one end of the screen frame is provided with an upwardly open channel profile and the other end with a similar but downwardly open channel profile, such that the outboard edge of an upwardly open profile will fit within the channel of a downwardly open profile provided along the edge of an adjoining screen frame, to enable two such screens to be connected together and to enable linear movement in a direction generally perpendicular to the line of engagement and generally in the plane of at least one of the two screens, to be transmitted from one screen frame to the other.

The invention also lies in a screen as aforesaid when fitted to an adjoining similar screen wherein the engagement of one profile by another also serves to close the gap between the two screen frames and prevent at least particulate material from passing therebetween.

Preferably the engagement of the two profiles is adapted to prevent liquid from passing therebetween.

Typically when fitted in a support structure in a shaker or sifting machine a screen as aforesaid, together with a second similar screen, are arranged in tandem, one behind the other, the inner one constituting the rear screen and the other the front screen of a pair when viewed from the front of the machine.

In such an arrangement the two screens may be in generally planar alignment.

When combined to form a pair of screens the engagement may comprise a lost motion connection so as to permit one frame to be hingeable relative to the other about the connection.

In some applications the support structure may be adapted so as to cause one screen to be angled relative to the plane of the other.

Whether aligned in one plane or angled, the engagement of the two frame edge profiles provides a reliable force-transmitting connection to enable a rear screen frame to be removed from the support structure simply by pulling out the front frame of the pair.

A support structure for such a pair of screens typically comprises parallel rails for supporting left and right hand edges of the two screen frames, a transversely extending rear ledge for supporting the far end of the rear screen frame, and an inflatable rim seal which when inflated and pressurised firmly sandwiches the edges of the frames between the inflated seal and the rails and the ledge so as to prevent any movement of the frames in the support structure once the seal is inflated, but which when deflated permits movement of the screens relative to the rails for movement in and out of the support structure and also vertical movement of one frame relative to the other, to facilitate the entry of one profile into the other to effect the said engagement with the two screens in the support structure and the invention lies in a support structure as aforesaid when fitted with two such screens.

The invention also lies in method of joining two screens as aforesaid in a support structure which comprises parallel rails for supporting left and right hand edges of the two screen frames and a transversely extending rear ledge for supporting the far end of the rear screen frame, and an inflatable rim seal which when inflated and pressurised firmly sandwiches the edges of the frames between the inflated seal and the rails and the ledge so as to prevent any movement of the frames in the support structure once the seal is inflated, but which when deflated permits movement of the screens relative to the rails for movement in and out of the support structure and also vertical movement of one frame relative to the other, wherein the end of the frame provided with the downwardly open profile is lifted up within the support structure relative to the upwardly open profile provided at the end of the other frame, to allow the downwardly open profile to pass up and over the outboard wall of the channel of the upwardly open profile and thereafter to drop into and engage the said channel to effect the engagement.

The two screens may be slid one after the other into the support structure with the first to be slid into position being arranged with its upwardly open profile at its trailing end.

Preferably the second screen to be pushed into the support structure is inserted until its leading end abuts the rear end of the first screen, and the external shape of the profiles is adapted to cause the leading end of the second screen to rise up and over the profile on the rear end of the first screen with continued forward movement of the second screen.

Two screens which have been fitted in a support structure aforesaid may be removed therefrom by deflating the rim seal, pulling the two frames out as one until the first frame is clear of the support structure, disengaging the edge profile of its inboard end from the edge profile along the outboard edge of the inner screen, and thereafter gripping the latter, and pulling it in an outward sense until it also is clear of the support structure.

Although the male/female engagement of the edges of the frames described in GB 2,322,590 and GB 2,292,533 provided a degree of interference as between one frame and the next when in line, the engagement of these frame edges did not provide a reliable force-transmitting connection such as has been found to be necessary to allow a rear frame to be pulled out simply by pulling out the front frame of a pair, especially after use, when both frames are heavily encrusted with mud and especially the rear one may be very resistant to sliding movement.

As stated, the screens may be located in a support structure comprising parallel rails for supporting the left and right hand edges of the frames and a transversely extending rear ledge for supporting the far end of the rear screen frame, and an inflatable rim seal is provided which when pressurised firmly sandwiches the edges of the frames between the inflated seal and the rails and the ledge. Once inflated, the squeeze exerted on the frame edges prevents any movement of the frames. However once deflated, both frames are not only capable of being slid along the rails but are also capable of limited relative vertical movement. It is this latter degree of freedom which renders the engagement shown in the earlier Patent Specifications insufficient to provide a reliable traction connection to be provided between the two frames.

Likewise this relative vertical movement, which is possible when the seal is deflated, may be employed as already described to assist in joining the edges of a pair of screen frames embodying the invention, to permit one frame to be lifted relative to the other to allow its outboard downwardly extending edge profile lip to be lifted over the corresponding but upwardly extending edge profile lip at the adjoining end of the other frame, thereafter to be dropped thereinto to effect the join.

Of course, once the two edges are so engaged, the two frames are positively joined together and sliding movement of one, in a direction perpendicular to the join, will be reliably transmitted to the other, so that the two will move as one. As already described the rear frame therefore can be pulled out simply by pulling the front frame. Once the latter is clear of the support assembly within the chamber, the edge profile of its rear end can be disengaged from the edge profile along the front edge of the rear screen. The latter is then available to be pulled out by gripping it along its front leading edge, and pulling.

The invention will now be described by way of example with reference to the accompanying drawings, in which:

FIG. 1 is a plan view of a screen frame,

FIG. 2 is a section on line AA of FIG. 1,

FIG. 3 is a section on line BB of FIG. 1,

FIG. 4 is a cross-section through the edge profile of the front (outboard when fitted) edge (left hand end) of the screen of FIG. 1, and FIG. 5 is a cross-section through the edge profile of the rear (inboard when fitted) edge (left hand end) of the screen of FIG. 1.

Figure 1:
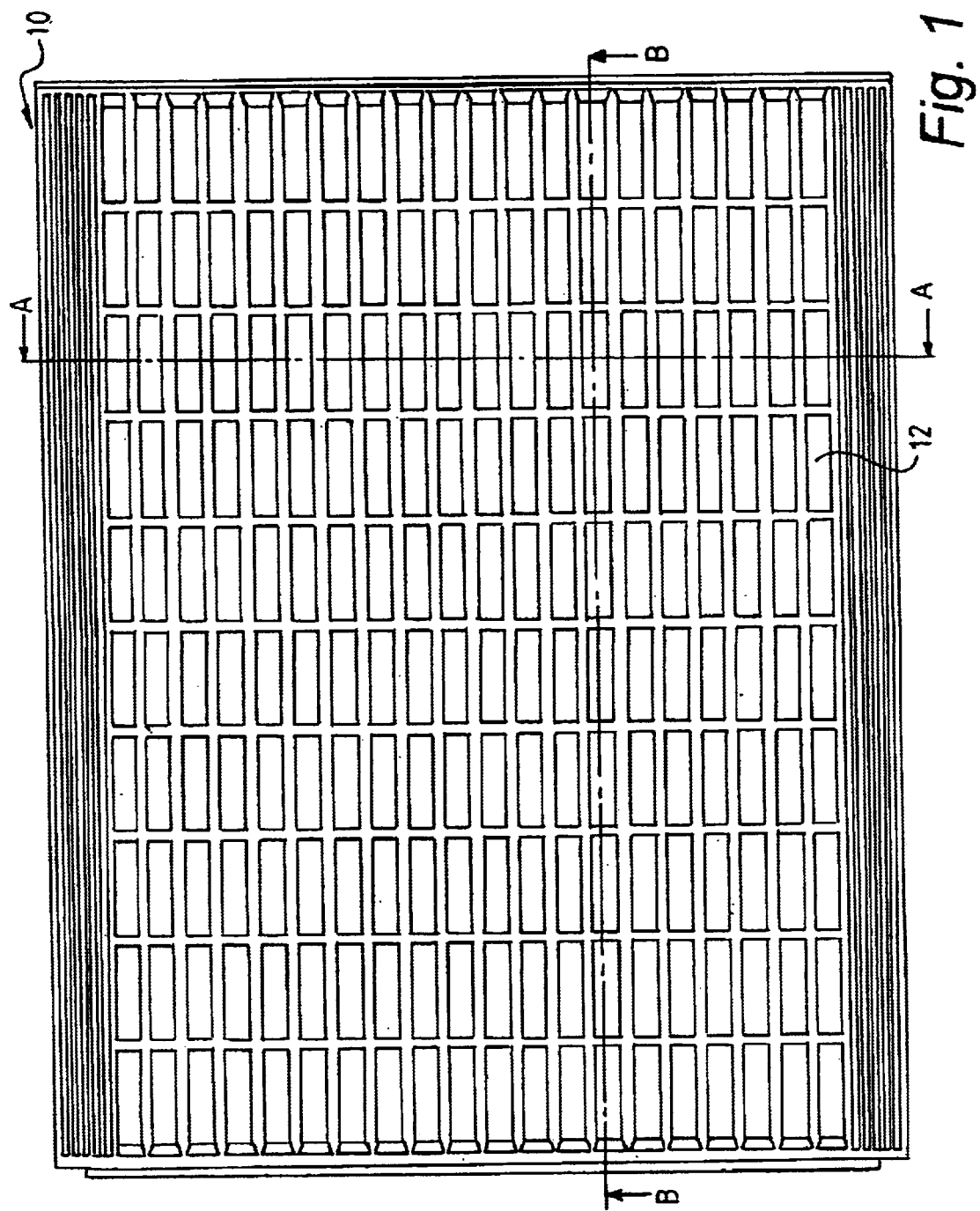
In FIG. 1 a screen similar to that described in relation to the drawings in UK Patent 2,322,590 is shown in plan view from above. The screen is comprises of a GRP frame 10 having an orthogonal array of ribs which divide the area bounded by the outer edges of the frame, into a plurality of rectangular similarly sizes windows such as 12. Although not shown, woven wire cloth is stretched over the frame and bonded to the outer edges and the ribs in a manner such as described in UK Patent 2,322,590.
Figure 4:
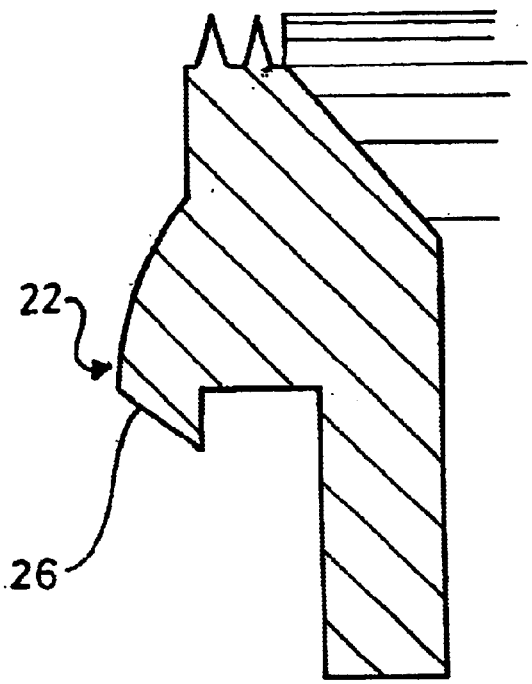
Figure 5:
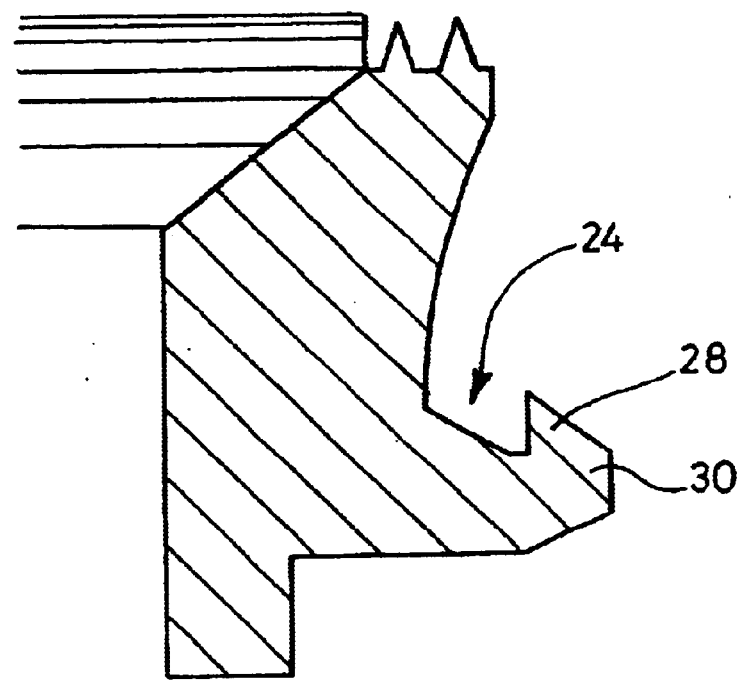

The frames will normally be arranged in tandem in a support assembly with the left hand end of the frame of FIG. 1 abutting what would be the right hand end of a similar frame, ahead of it (i.e. to the left of the screen in FIG. 1), in the support assembly. The latter includes two rails 13 which respectively engage the undersides of the two longer edges 14, 16 (see FIG. 2) of the frame, and a lip (not shown) co-planar with the rails, which extends across the support assembly to support the underside 18 of the edge profile 20 along the rear edge of the innermost frame. An inflatable rim seal 15 is provided for pressing edges 14, 16 against the rails 13.

Generally a second pair of screens is arranged co-planar with, and to one side of, the first pair, supported in a similar manner on two parallel rails and a transverse rear lip. Filtering is achieved by pouring mud onto the area defined by all four screens, and shaking the support assembly while so doing, causing solids to migrate over the screens and liquid to pass through the woven wire cloth.

The junction between the two screens is formed by engaging the downwardly protruding lip 22 of the edge of one frame into the upwardly facing channel 24 of the edge profile along the adjoining edge of the other frame.

It will be seen that the underside 26 of the lip 22 is inclined at approximately 45° and the upper edge 28 of the lip 30 defining the channel 24 is similarly inclined at 45°, in a complementary fashion to the slope 26 on 22. In this way, provided upward vertical movement can occur of the frame having the edge carrying the downwardly protruding lip 22, sliding movement of the frame carrying lip 22 in a direction towards the edge of an aligned frame carrying the channel 24 will, when face 26 engages face 28, cause the frame carrying lip 22 to rise up due to the engagement of the two 45° inclined surfaces, until the lip 22 can drop into the channel 24. The two frames are then securely joined edge to edge, and can be handled as a single entity.

By ensuring that the lip 22 extends fully across the width of the frame (as seen at the right hand end of FIG. 1) even if the co-operating female profile of lip 30 and channel 24 does not extend fully across the end of the other frame, (as shown at the left hand end of FIG. 1), the lip 22 will act as a cover for the join, and this, and its engagement in the channel 24, will prevent any particulate material from passing through the join between the two edges.

What is claimed is:

1. A screen for use as a filter in a vibratory filtration equipment, the screen having a first end formed with an upwardly open channel profile and including an upwardly and outwardly directed inclined face, and a second opposite end formed with a corresponding downwardly open channel profile and including a complementary downwardly and outwardly inclined face, whereby when placed end-to-end along a line of engagement with a second similar screen, with the second end of the first mentioned screen abutting the first end of the second screen, a pushing together of the two screens in a direction generally perpendicular to said line of engagement and in the plane of at least one of the two screens, causes said downwardly inclined face to engage said upwardly inclined face and causes the first end of said second screen to slidingly rise up until the screens to become firmly connected together to form a join along the line of engagement, so that when one screen is pulled in a direction away from the other screen the two screens will reliably move as a single entity.

2. A screen as claimed in claim 1 when fitted to an adjoining second similar screen, wherein the engagement of the two screens at said join serves to close any gap between the two screens and prevent particulate material from passing therebetween.

3. A screen as claimed in claim 2 wherein the engagement at said join is also adapted to prevent liquid from passing therebetween.

4. A screen as claimed in claim 1 when fitted in a support structure in a shaker or sifting machine, together with an adjoining second similar screen in tandem, one behind the other, the second screen constituting the rear screen and the first mentioned screen constituting the front screen of a pair when viewed from in front of the machine.

5. A combination of two screens as claimed in claim 4 wherein the two screens are in generally planar alignment.

6. A combination of two screens as claimed in claim 4 wherein the engagement between the screens is such as to permit one screen to be hingeable relative to the other about said join.

7. A combination of two screens as claimed in claim 4 wherein the engagement at said join provides a reliable force-transmitting connection to enable said rear screen to be removed from the support structure simply by pulling out the front screen of said pair.

8. A combination of two screens as claimed in claim 4 in a support structure which comprises parallel rails for supporting left and right hand edges of the two screens, and an inflatable rim seal which when inflated and pressurised firmly sandwiches the edges of the screens between the inflated seal and the rails so as to prevent any movement of the screens in the support structure once the seal is inflated, but which when deflated permits movement of the screens relative to the rails for movement in and out of the support structure and also vertical movement of one screen relative to the other screen, to facilitate the entry of one channel profile into the other to effect the said engagement with the two screens in the support structure.

9. A combination as claimed in claim 4, further comprising a support structure which comprises parallel rails for supporting left and right hand edges of the two screens.

10. A method of joining first and second filtering screens in a support structure of a vibratory filtration equipment. each screen having a first end formed with an upwardly open channel profile and including an upwardly and outwardly directed inclined face, and a second end formed with a corresponding downwardly open channel profile and including a complementary downwardly and outwardly inclined face, in which the support structure comprises parallel rails for supporting left and right hand edges of the two screens, comprising the steps of placing the two screens upon the parallel rails with the second end of the first screen abutting the first end of the second screen, pushing the screens together to cause said downwardly inclined face to engage said upwardly inclined face and to cause said second end to rise up relative to said first end, thereby allowing the downwardly open channel profile to pass up and over a channel of the upwardly open channel profile of the second screen wad drop into said channel to effect the engagement, and further pushing the first screen to bring the joined screens into the desired position within the support member.

11. A method as claimed in claim 10, further comprising the steps of withdrawing the joined screens by pulling on the first screen until it is clear of the support structure, disengaging the downwardly open profile of the first screen from the upwardly open profile of the second screen, gripping the second screen, and pulling it until it also is clear of the support structure.

* * * * *